(12) United States Patent
Corbett

(10) Patent No.: US 7,778,929 B2
(45) Date of Patent: Aug. 17, 2010

(54) ONLINE MUSIC AND OTHER COPYRIGHTED WORK SEARCH AND LICENSING SYSTEM

(75) Inventor: Richard Corbett, London (GB)

(73) Assignee: Ricall Inc., New York, NY (US)

( * ) Notice: Subject to any disclaimer, the term of this patent is extended or adjusted under 35 U.S.C. 154(b) by 0 days.

(21) Appl. No.: 12/001,866

(22) Filed: Dec. 13, 2007

(65) Prior Publication Data

US 2008/0215494 A1 Sep. 4, 2008

Related U.S. Application Data

(60) Provisional application No. 60/869,744, filed on Dec. 13, 2006.

(51) Int. Cl.
  *G06F 21/00* (2006.01)
(52) U.S. Cl. .............................. 705/59; 705/50; 705/51
(58) Field of Classification Search .............. 705/50–59
  See application file for complete search history.

(56) References Cited

U.S. PATENT DOCUMENTS

| | | | |
|---|---|---|---|
| 5,629,980 A * | 5/1997 | Stefik et al. ................... | 705/54 |
| 6,189,146 B1 * | 2/2001 | Misra et al. .................. | 717/177 |
| 6,226,618 B1 | 5/2001 | Downs et al. | |
| 6,385,596 B1 | 5/2002 | Wiser et al. | |
| 6,389,538 B1 | 5/2002 | Gruse et al. | |
| 6,502,194 B1 | 12/2002 | Berman et al. | |
| 6,636,867 B2 | 10/2003 | Robertson | |

(Continued)

FOREIGN PATENT DOCUMENTS

EP 1286515 A2 2/2003

(Continued)

OTHER PUBLICATIONS

Jamkhedkar, P.A.; Heileman, G.L.; Martinez-Ortiz, I.; "Middleware Services for DRM." Communication Systems Software and Middleware, 2007. COMSWARE 2007. 2nd International Conference on Jan. 7-12, 2007 pp. 1-8 Digital Object Identifier 10.1109/COMSWA.2007.382563.*

(Continued)

*Primary Examiner*—Evens J Augustin
*Assistant Examiner*—Calvin K Cheung
(74) *Attorney, Agent, or Firm*—K&L Gates LLP

(57) ABSTRACT

Search and licensing systems and method for copyrighted works, such as music tracks, images, and video. The system may comprise a database that stores data regarding copyrighted works. The system may also comprise a search engine for allowing a user to search the database for copyrighted works. The system also comprises a licensing module that implements licensing negotiations between the user and a copyright licensor for a selected copyrighted work selected by the user. The licensing module may send an electronic quote request via email to the licensor in response from a license request from the user. The email may contain an activation link to a web site at which the licensor can enter a quote for a license to use the copyrighted work in accordance with use details input by the user. Also disclosed are systems and methods for automating licensing negotiations for copyrighted works detected and recognized in uploaded files (such as video files) to be distributed via the Internet or other communication networks.

12 Claims, 4 Drawing Sheets

U.S. PATENT DOCUMENTS

| | | | |
|---|---|---|---|
| 6,868,403 B1 | 3/2005 | Wiser et al. | |
| 6,928,423 B1 | 8/2005 | Yamanaka | |
| 6,934,390 B2 | 8/2005 | Moskowitz et al. | |
| 6,947,909 B1 | 9/2005 | Hoke, Jr. | |
| 6,954,738 B2 | 10/2005 | Wang et al. | |
| 6,963,858 B2 | 11/2005 | Wang et al. | |
| 6,976,010 B2 | 12/2005 | Banerjee et al. | |
| 6,978,369 B2 | 12/2005 | Wheeler et al. | |
| 6,980,971 B2 | 12/2005 | Yamanaka | |
| 7,047,241 B1 * | 5/2006 | Erickson | 707/9 |
| 7,047,416 B2 | 5/2006 | Wheeler et al. | |
| 7,096,201 B2 | 8/2006 | Yamanaka | |
| 7,099,849 B1 * | 8/2006 | Reeder et al. | 705/59 |
| 7,099,946 B2 * | 8/2006 | Lennon et al. | 709/227 |
| 7,127,606 B2 | 10/2006 | Wheeler et al. | |
| 7,155,414 B2 | 12/2006 | Barritz et al. | |
| 7,240,206 B2 | 7/2007 | Kori et al. | |
| 7,324,996 B2 | 1/2008 | Walters et al. | |
| 7,346,581 B2 | 3/2008 | Yamanaka | |
| 7,356,701 B2 | 4/2008 | Margolus et al. | |
| 2001/0021976 A1 | 9/2001 | Shibuya et al. | |
| 2001/0049648 A1 * | 12/2001 | Naylor et al. | 705/37 |
| 2002/0003886 A1 | 1/2002 | Hillegass et al. | |
| 2002/0010679 A1 | 1/2002 | Felsher | |
| 2002/0012432 A1 * | 1/2002 | England et al. | 380/231 |
| 2002/0019743 A1 | 2/2002 | Nakamura | |
| 2002/0034302 A1 | 3/2002 | Moriai et al. | |
| 2002/0065808 A1 * | 5/2002 | Yu | 707/1 |
| 2002/0083006 A1 | 6/2002 | Headings et al. | |
| 2002/0091848 A1 | 7/2002 | Agresta et al. | |
| 2002/0152173 A1 | 10/2002 | Rudd | |
| 2002/0156743 A1 | 10/2002 | DeTreville | |
| 2002/0199117 A1 | 12/2002 | Nagaya | |
| 2003/0033254 A1 | 2/2003 | Tanaka | |
| 2003/0074563 A1 | 4/2003 | Spacey | |
| 2003/0188177 A1 | 10/2003 | Hoke, Jr. | |
| 2004/0006541 A1 | 1/2004 | Huddelston et al. | |
| 2004/0044629 A1 * | 3/2004 | Rhodes et al. | 705/59 |
| 2004/0139024 A1 | 7/2004 | So | |
| 2004/0143743 A1 | 7/2004 | Margolus et al. | |
| 2004/0143745 A1 | 7/2004 | Margolus et al. | |
| 2004/0162785 A1 | 8/2004 | Stone | |
| 2004/0210538 A1 | 10/2004 | Forest | |
| 2005/0027991 A1 | 2/2005 | DiFonzo | |
| 2005/0033699 A1 | 2/2005 | Umeo et al. | |
| 2005/0114672 A1 | 5/2005 | Duncan et al. | |
| 2005/0119977 A1 | 6/2005 | Raciborski | |
| 2005/0125221 A1 | 6/2005 | Brown et al. | |
| 2005/0149741 A1 | 7/2005 | Humbel | |
| 2005/0195975 A1 | 9/2005 | Kawakita | |
| 2005/0209973 A1 | 9/2005 | Okamoto et al. | |
| 2005/0251491 A1 | 11/2005 | Medina et al. | |
| 2005/0278258 A1 | 12/2005 | O'Donnell et al. | |
| 2006/0004600 A1 | 1/2006 | Summer et al. | |
| 2006/0010075 A1 | 1/2006 | Wolf | |
| 2006/0015365 A1 | 1/2006 | Stofko | |
| 2006/0020556 A1 | 1/2006 | Hamnen | |
| 2006/0053079 A1 | 3/2006 | Edmonson et al. | |
| 2006/0085634 A1 | 4/2006 | Jain et al. | |
| 2006/0085646 A1 | 4/2006 | Cutter, Jr. et al. | |
| 2006/0167803 A1 | 7/2006 | Aydar et al. | |
| 2006/0167804 A1 | 7/2006 | Aydar et al. | |
| 2006/0167809 A1 | 7/2006 | Bhambri et al. | |
| 2006/0167810 A1 | 7/2006 | Bhambri et al. | |
| 2006/0167813 A1 | 7/2006 | Aydar et al. | |
| 2006/0167819 A1 | 7/2006 | Bhambri et al. | |
| 2006/0190413 A1 | 8/2006 | Harper | |
| 2006/0200413 A1 | 9/2006 | Kessel et al. | |
| 2006/0239500 A1 | 10/2006 | Meyer et al. | |
| 2007/0106551 A1 * | 5/2007 | McGucken | 705/10 |
| 2008/0301058 A1 * | 12/2008 | Campbell et al. | 705/80 |

FOREIGN PATENT DOCUMENTS

| | | | |
|---|---|---|---|
| EP | 1505476 A2 | 2/2005 | |
| JP | 2000036781 A | 2/2000 | |
| JP | 2001043269 A | 2/2001 | |
| JP | 2002082673 A | 3/2002 | |
| JP | 2002163462 A | 6/2002 | |
| JP | 2002189870 A | 7/2002 | |
| JP | 2003076912 A | 3/2003 | |
| JP | 2003099553 A | 4/2003 | |
| JP | 2005122863 A | 5/2005 | |
| JP | 2006079569 A | 3/2006 | |
| WO | WO 97/50248 A1 | 12/1997 | |
| WO | WO 0178304 A1 | 10/2001 | |
| WO | WO 02/11036 A1 | 2/2002 | |
| WO | WO 02/054643 A1 | 7/2002 | |
| WO | WO 03/003248 A1 * | 9/2003 | |
| WO | WO 2006/014295 A2 | 2/2006 | |
| WO | WO 2006/091654 A2 | 8/2006 | |
| WO | WO 2006/112945 A2 | 10/2006 | |

OTHER PUBLICATIONS

Arnab, A.; Hutchison, A.; "DRM Use Licesne Negotiation using ODRL v2.0." 2007. All Pages. [URL: http://pubs.cs.uc.tac.za/archive/00000446/.../arnab-hutchison-virtualGoods07.pdf].*

Arnab, A. "Requirement Analysis of ODRL V2 Model." 2007. All Pages. [URL: http://people.cs.uct.ac.za/~aarnab/drm/papers/odrl_req_anal.pdf].*

Arnab, A.; Hutchison, A.; "DRM Use Licesne Negotiation using ODRL v2.0." 2007. All Pages. [URL: http://people.cs.uct.ac.za/~aarnab/.../Arnab-Hutchison-DMP-IDP-3-Proposal.pdf].*

* cited by examiner

ONLINE MUSIC AND OTHER COPYRIGHTED WORK SEARCH AND LICENSING SYSTEM

PRIORITY CLAIM

The present application claims priority to provisional application Ser. No. 60/869,744, filed Dec. 13, 2006, entitled "Online Music Search And Licensing System," by Richard Corbett, which is incorporated herein by reference.

BACKGROUND

A copyright is form of intellectual property protection that covers published and unpublished creative works, whatever the form of expression, provided such works are fixed in a tangible form. In general, copyright laws grant the owner of the copyright the exclusive right to reproduce, prepare derivative works, distribute, perform, and display the work publicly. Accordingly, a party or person seeking to use a copyrighted work typically needs to obtain a license from the copyright owner to use the copyrighted work.

Obtaining the appropriate licenses is made more complicated by the fact that different parties may own or have exclusive control over a different portion of the full bundle of rights for a copyrighted work. For example, one party may own or have the exclusive right to make one type of derivative work from the copyrighted work, and another party may own or have the exclusive right to make another type of derivative work. A third party may own or have the exclusive right to display the copyrighted work, and yet another party may own or have the exclusive right to reproduce and distribute the copyrighted work. Also, the rights may also be divided up by region. That is, one party may own or have the exclusive right to display the work in one geographic region and another party may own or have the exclusive right to display the work in another geographic region.

A party seeking to use a copyrighted work for some purpose, such as an advertising campaign, a movie, or a television show, for example, may therefore need to obtain a number of different licenses from potentially a number of different parties. For example, if a movie house wants to use a copyrighted song in a movie distributed worldwide, it may need to obtain the right to play the song in each of the relevant geographic regions. It will also need the right to distribute the song to each of the theatres where the movie is to be played. If the movie house intends to sell CDs with the soundtrack of the movie and DVDs of the movie, it may also need licenses for these uses as well. The movie house may have to obtain such licenses for each copyrighted song in the movie. Also, it may need additional licenses as new ways of reproducing and distributing digital manifestations of the copyrighted work become available, such as web downloads and cable-based video-on-demand systems. Current processes for obtaining such licenses are time consuming, cumbersome, and expensive. Ways to streamline and shorten the process are needed.

Another complicating factor is that the advent of digital media and high-speed computer networks has made the copying of digital copyrighted works much easier. The fact that copying is easier, however, does not obviate the need to obtain appropriate licenses. Nevertheless, a current and escalating problem in today's society is that many Internet users post copyrighted works (e.g., videos or music tracks) on the Internet for downloading by others without the appropriate licenses. Ways for simplifying the process of obtaining the appropriate licenses are therefore needed.

SUMMARY

In one general aspect, the present invention is directed to computer-implemented search and licensing systems and methods for copyrighted works, such as music tracks, images, and video, that implements licensing negotiations between a user (e.g., licensee) and the licensor (e.g., copyright owner, representative, or other party having the right to license one or more of the bundle of rights associated with a copyright). According to one embodiment, the system comprises a database that stores data regarding copyrighted works. The system also comprises a search engine for allowing a user (e.g., an online user accessing the database via the Internet) to search the database for copyrighted works in response to search criteria input by the user. The system also comprises a licensing module that implements licensing negotiations between the user and the licensor for a selected copyrighted work selected by the user. The licensing module may send an electronic quote request via email to the licensor in response to a license request from the user. The email may contain an activation link to a web site at which the licensor can enter an unconfirmed quote for a license to use the copyrighted work in accordance with use details input by the user.

According to various implementations, the licensing module is programmed to notify the user that the licensor has declined to license when the licensor does not respond to the quote request within a specified period of time, such as twenty-four hours. If the licensor enters an unconfirmed quote, the licensing module may further be programmed to: (i) provide the user with the electronic unconfirmed quote; (ii) notify the licensor of the user's acceptance of the unconfirmed quote when the user's accepts the unconfirmed quote; (iii) send an electronic confirmed quote to the user when the user accepts the unconfirmed quote; and (iv) send draft electronic contracts to the user and the licensor when both the licensor and the user accept the confirmed quote. The contracts may comprise terms based on the use details entered by the user.

In addition, the system may comprise a production module where the user can specify the use details for the selected copyrighted work. The use details may generally comprise licensing parameters important to the licensor in deciding whether and at what price/terms to quote the license. For example, the use details may comprise the intended use (e.g., advertisement, radio program, television program, video game, motion picture, etc.), the media (e.g., television, radio, Internet, etc.), the duration (or term) of the use, and the geographic regions where the use it to occur (e.g., U.S., Europe, etc.).

In another general aspect, the present invention is directed to computer-implemented systems and methods for automating licensing negotiations for copyrighted works detected and recognized in uploaded files (such as video files) to be distributed via the Internet or other communication networks. According to various embodiments, the method may comprise the step of processing the uploaded file to determine whether the uploaded file comprises a copyrighted work. For example, if the uploaded file is a video file that comprises audio, the file may be processed (or scanned) to determine whether the audio comprises a copyrighted music track. This process may be performed by music recognition software that uses pattern recognition algorithms to detect and recognize copyrighted works (if any) in the uploaded file. If a copyrighted work is recognized in the uploaded file, automating licensing negotiations between the uploader of the uploaded file and a licensor of the recognized copyrighted work may be commenced. If a license is not successfully negotiated, the uploaded file may be removed from the site to thereby prevent further downloading of the file. In addition, if a license is successfully negotiated, downloads of the file may be monitored and a portion of revenue (if any) generated from the downloads may be shared with the licensor.

FIGURES

Various embodiments of the present invention are described herein by way of example in conjunction with the following figures, wherein.

Figure 3:
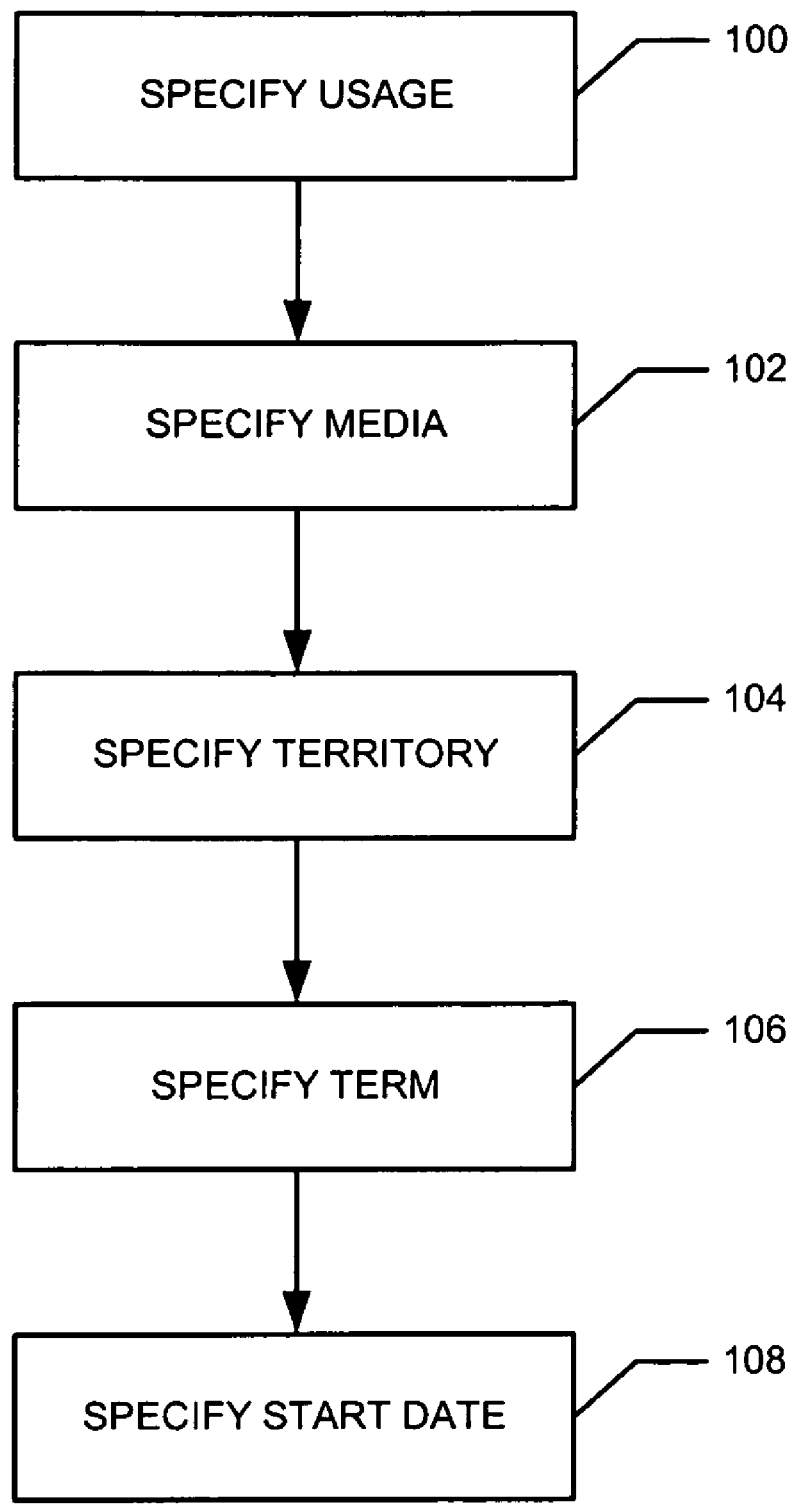
Figure 4:
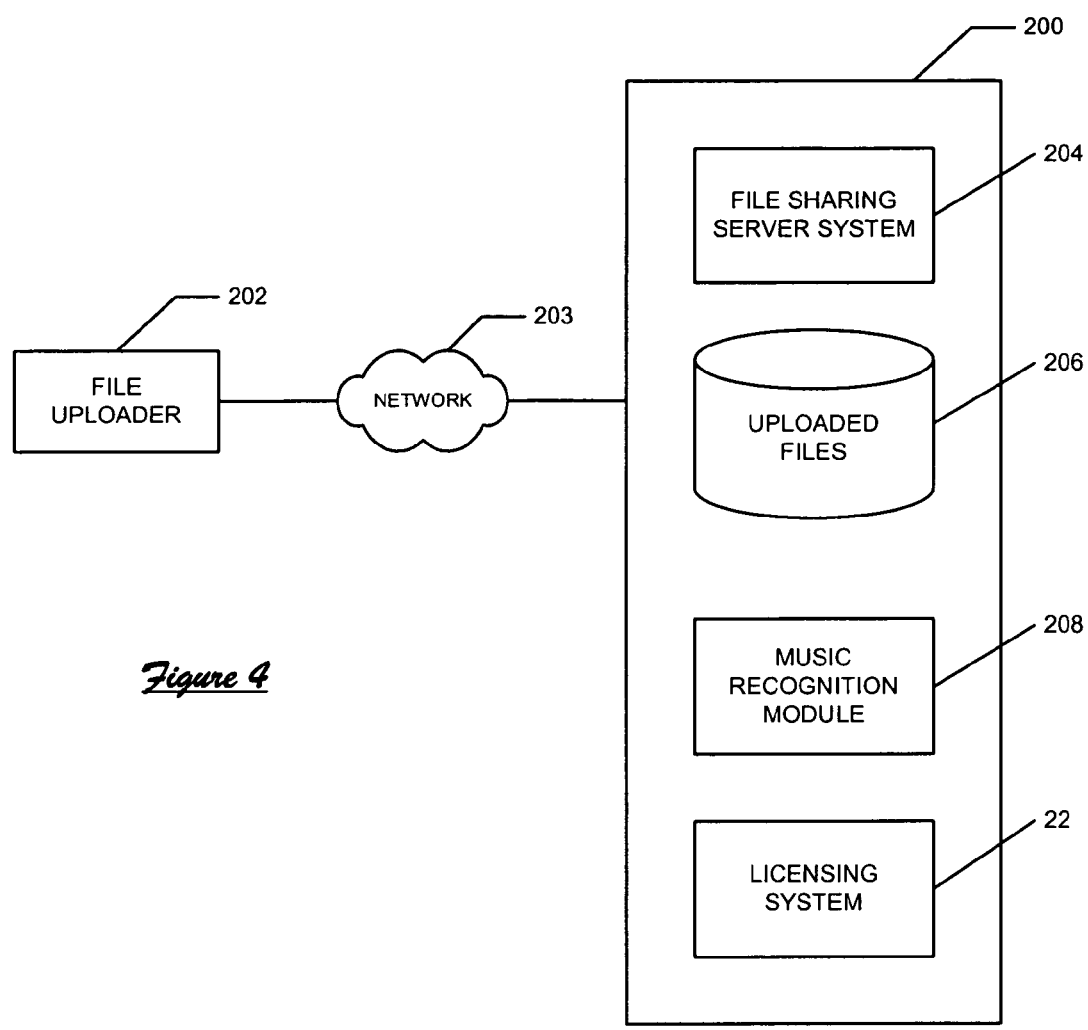

FIG. 3 is a diagram that shows the process by which the buyer may specify the licensing parameters for the track(s) in the production folder according to various embodiments of the present invention; and FIG. 4 is a simplified diagram of a system for recognizing copyrighted works in a file uploaded to a file sharing service and automating licensing negotiations for the recognized copyrighted works if necessary according to various embodiments of the present invention.

DETAILED DESCRIPTION

Figure 1:
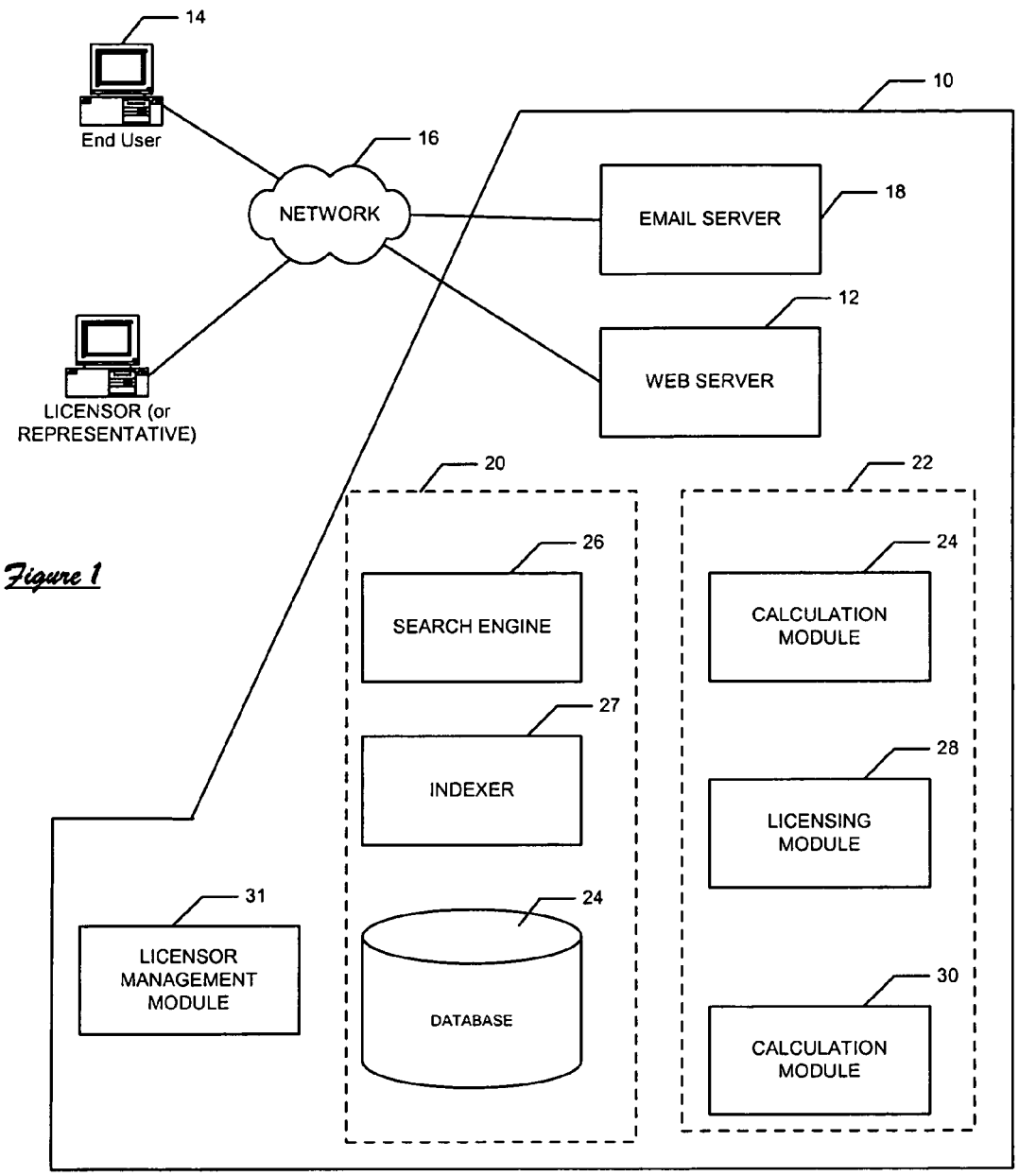
FIG. 1 is a simplified block diagram of an online search and licensing system according to various embodiments of the present invention.

FIG. 1 is a simplified block diagram of an computer-based, online search and licensing system 10 according to various embodiments of the present invention. The system 10 may provide creative users (e.g., users needing to license copyrighted works for some purpose or campaign (e.g., a commercial, a video game, a presentation, etc.)) with the opportunity to search for desired music tracks or other copyrighted works using the system's search facility. Via the Internet (or other type of communication network), for example, the user may select various works for use and submit requests to license those works directly to the relevant licensors (e.g., copyright owners). As described below, the system 10 may then automate licensing negotiations between the user and the licensor(s) for the selected copyrighted works.

The copyrighted works may be, for example, music, images, or video. For the sake of simplicity, embodiments of the present invention are generally described herein in the context of a system for searching for and licensing copyrighted music tracks, although it should be recognized that the invention is not so limited. The systems and methods described herein could be used for other types of copyrighted works, such as images and video.

As shown in FIG. 1, the system 10 may comprise a web server (or servers) 12 for communicating with end users 14 via a communication network 16, such as the Internet, an intranet, a WAN, a LAN, virtual private network (VPN), etc. The web server 12 may serve web pages to end users that allow the end users to enter search queries for searching for copyrighted works (e.g., music tracks), managing production files using a web-based application, etc. The web server 12 may be implemented one or a number of computer devices (e.g., a server) that is programmed with software to perform the intended functions. The system 10 may also comprise an email server (or servers) 18 for sending and receiving emails via the network 16, as described further below. Similarly, the email server(s) 18 may be implemented as one or a number of networked computer devices (e.g., a server) acting as a mail transfer agent by executing appropriate software to transfer electronic mail from one computer system to another.

Also as shown in FIG. 1, the system 10 may include a search system 20 and a licensing system 22. The search system 20 may comprise a database 24 that may contain data regarding the copyrighted works. For example, for a system used to search for and license music tracks, the database 24 may contain data pertaining to numerous searchable music tracks, such as title, genre, album, artist, lyrics, copyright owner, tempo, release year, etc. The database 24 may also contain digital files (e.g., MP3 files) of the tracks for downloading by the user, as described further below. The search system 20 may also comprise a search engine 26 for searching the database 24 in response to a search query from the user. The search system 20 may also comprise an indexer 27 for indexing entries in the database 24. The search engine 26 and the indexer 27 may be individually or collectively implemented as one or a number of networked computers that are programmed with software to perform the described functions.

The licensing system 22 may comprise a production module 29, a licensing module 28, and a calculation module 30. Using the production module 29, the user can place selected works (e.g., music tracks) in a production folder. As further described below, the user can specify usage details for the selected works in the production folder, the usage details comprising relevant parameters for licensing of the works, e.g., parameters that the licensee would consider important in deciding whether to and, if so, at what price to license the rights to the selected copyright work. The user can also manage copyrighted works in the production folder, as explained further below.

The licensing module 28, as explained further below, may provide, implement and manage the automated licensing function provided by the system 10. Given that, on average, there are usually numerous copyright licensors per each individual track/song sought to be licensed by the end user (due, in part, to the fact that different parties may control different rights of the bundle of rights associated with a copyright), the calculation module 30 may determine whether the aggregate price from the price quotes of the numerous copyright licensors is within a market range for similar types of requests previously transacted via the system 10.

The licensing system 22 may be implemented as one or a number of networked computer devices. The modules 24, 28, 30 of the licensing system 22 may be implemented as software stored in a memory device (e.g., a RAM memory device or a disk drive storage device) of the licensing system 22. A processor (or processors) of the licensing system may execute the software code of the various modules to perform the functions described above.

Figure 2:
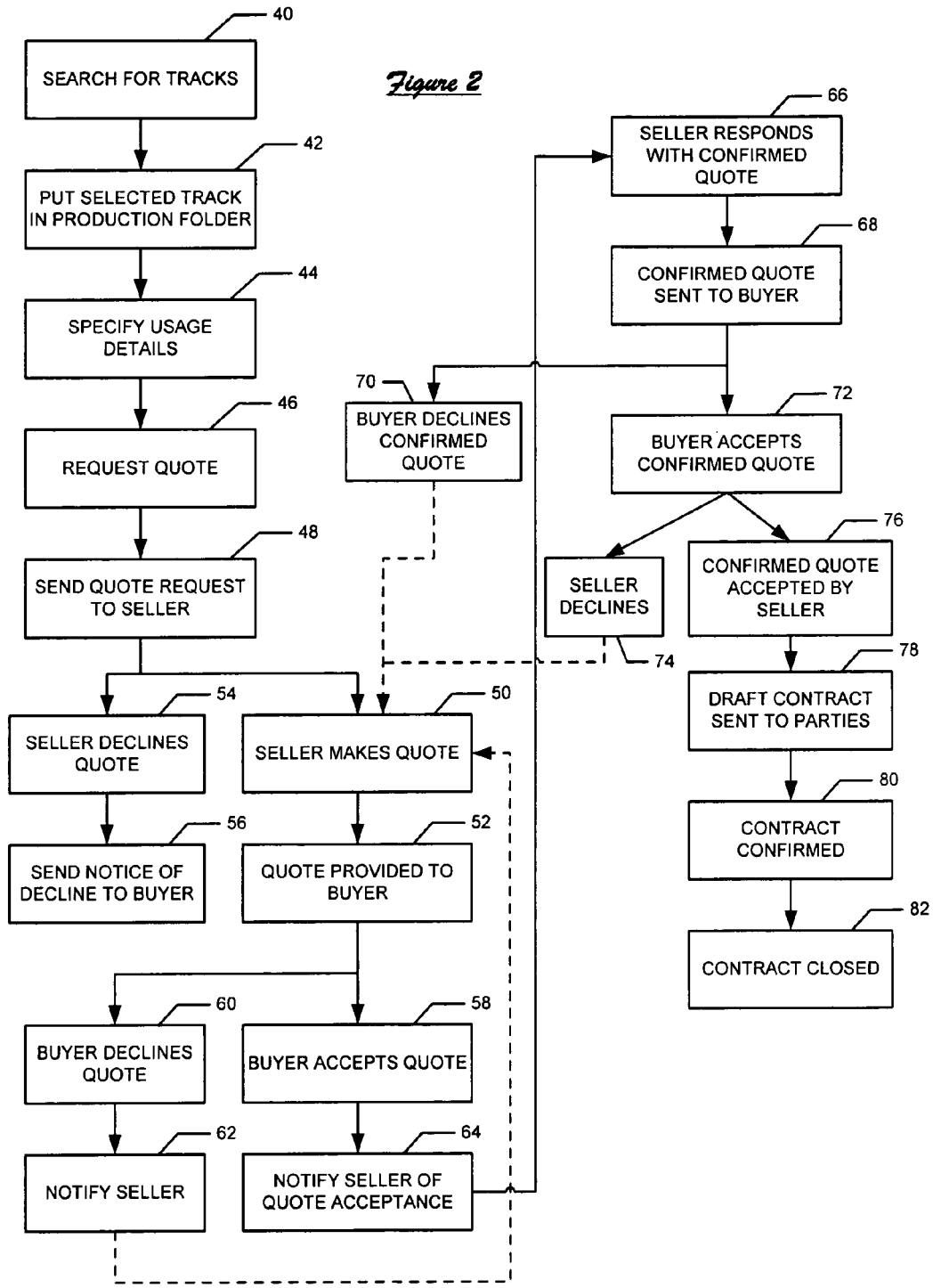
FIG. 2 is a diagram of a process that may be employed using the system of FIG. 1 to search and license copyrighted works according to various embodiments of the present invention.

FIG. 2 is a diagram of a process that may be employed using the system 10 to search and license copyrighted works according to various embodiments of the present invention. The following description assumes that the end-user (or "buyer") is seeking to license a copyrighted music track from a licensor, although as mentioned above, it should be recognized that the invention is not limited to music tracks and could be used for other types of copyrighted works. The licensor may be the copyright owner or any other party having the right to license the work (such as by exclusive license with the right to sub-license one or more rights associated with a copyright, or a designated representative for such party, as the case may be).

At step 40, the buyer logs into a web site hosted by the system 10 and submits a search query to find tracks satisfying the search query. Through the user interface provided by the web server 12, the buyer may be able search music tracks using a wide variety of search criteria, such as: artist; album; song title; genre; mood; lyric key words; activity; subject; tempo; instrument; chart position (e.g., Billboard Top 100, etc.); and entry year/release date. The search engine 26 may then search the database 24 for tracks that satisfy the search criteria and the results may be returned to the buyer via the web interface. The returned results may also include information on artists who have created works similar to the search criteria entered by the buyer. The buyer could select one of these artists and the system 10 would display tracks of the selected artist for which data is stored in the database 24.

The displayed results may also display relevant copyright owner/licensor information for the tracks/songs returned within the entire search result. The information may also rank the owners/licensors according to their percentage ownership/control of the copyrighted works. Selecting one of the owners/licensors may filter the search results by the selected copyright/licensor owner only, thereby returning just the tracks/songs of the selected copyright owner/licensor. Selecting the owner/licensor for a second time may direct the buyer, in various embodiments, to another web site hosted by the system 10 that is dedicated to the selected copyright owner/licensor that may then enable the buyer to use the search engine on the selected copyright owner's entire catalogue of tracks/songs only. In various embodiments, buyers could also go directly to a copyright owner/licensor branded version of the site at a different URL hosted by the system 10 and log in with a username and password to search just that copyright owner's tracks. The copyright owner/licensor may use this area to promote specific areas of their catalogue as they choose.

In addition, in various embodiments, the buyer can choose to further filter the search results by genre, tempo, release year, activities, subjects, moods, or instruments, for example. The buyer can also search for tracks that sound like other tracks by selecting a "soundslike" (or similar) button next to each track displayed in the search results.

At step 42, the buyer may place one or more of the tracks from the search results in a production folder or other similar file or repository. In various embodiments, the buyer can perform a variety of activities with respect to tracks in the production folder. The functions may be implemented by the production module 29. One function may be, at step 44 of FIG. 2, to specify the relevant licensing parameters for the buyer's intended use of the copyrighted work via the interactive, web-based user interface presented to the user. For example, as shown in the flowchart of FIG. 3, which shows one embodiment of the process by which the buyer may specify the licensing parameters for the track(s) in the production folder, at step 100, the buyer may first specify the intended usage for the track. Possible usages include (but are not limited to): advertisement; branded promotions; computer game; corporate production; DVD for sale; feature film; new media; radio program; television program; and website. Of course, in other embodiments, more or fewer possible uses may be provided to the buyer as potential uses from which to choose.

In various embodiments, once the use is specified, at step 102, the buyer may be prompted to specify the media for the use where relevant, using the interactive, web-based interface. The possible media options from which the buyer may choose may vary, and may be tailored based on the selected usage at step 100. For example, for an advertisement, the possible media options may include radio, television, cinema, internet, instore, call holding messages, ringtones, etc. For a computer game, the possible media may include various computer game platforms, such as PSP, Xbox, PS2, etc., or other game platforms. For some certain uses, like DVD sales, radio or television program, etc., there may be no need to specify the media, so the media selection process may be skipped.

At step 104, the buyer may be prompted to specify the geographic territory for the usage. The web interface may provide the buyer with a number of options, such as US, UK, Europe, etc. At step 106, the buyer may specify the term (or duration) of the usage (1 day, 1 month, 1 year, etc) and, at step 108, the start date.

It should be recognized that other processes can be used to specify the buyer's intended usage and that the processes may vary based on the buyer's inputs. For example, for items to be sold that include the copyrighted work (such as computer games), the buyer may be requested to specify the number of units to be manufactured, the place(s) of manufacture and sale, the dealer and retail prices, etc. For advertisements, movies, television shows, etc., the buyer may be requested to specify the duration of the track(s) to be used, etc.

The web interface provided by the production module 29 may also provide free text boxes where the buyer could type in certain relevant licensing criteria. For example, for advertisements, the buyer may specify the product in a free text box. For computer games, the web interface may provide a free text box where the buyer could enter the name of the game. For branded promotions, the web interface may provide free text boxes allowing the buyer to enter the brand, the product description, etc. For corporate productions, DVDs, feature films, radio and television programs, etc., the web interface may provide free text boxes allowing the buyer to enter the production or program titles, etc. The web interface may also be programmed to request other relevant information for licensing purposes based on the specified usage.

In addition to specifying the relevant licensing parameters, according to various embodiments, from the production folder the buyer may also be able to: (1) play the full track; (2) view track information; (3) view and/or request licensing quotes (described further below); (4) add a note to a track; (5) delete a track from the folder; and (6) invite other users to the production folder. The functions may be provided by the production module 29. When another user is selected to be invited to the production folder, the system 10 may send an email (via the email server 18) to the invited user with a link to the registration page for the site.

Returning to FIG. 2, after specifying the relevant licensing parameters at step 44, the buyer may request, at step 46, a licensing quote for the track(s) in the production folder. The licensing process may be provided, implemented, and managed by a licensing module 28 of the licensing system 22. The buyer can request price quotes for licenses for copyrighted tracks in a production folder by clicking on an associated icon for each track in the folder for which a quote is sought. When the buyer requests a quote, at step 48, the licensing module 22 may automatically send an email (via email server 18) or other type of electronic notification to a designated representative(s) of the copyright owner or other party controlling the relevant copyrights (hereinafter referred to as the "seller" or "licensor" for the sake of simplicity). The information regarding the identity and contact information of the licensor may be stored in the database 24. The email may include, for example, a link to a website hosted by the system 10 dedicated to the particular seller where the seller can view the details of the request. The details may include the licensing parameters previously specified by the buyer at step 44, for example.

In various embodiments, the sellers will be given a limited period of time to respond to the request (e.g., 24 hours). At step 50, if the seller decides to provide an unconfirmed quote, the seller may specify the license price for the unconfirmed quote through the web interface provided by the system 10. Given that, on average, there are usually numerous copyright owners/licensors per each individual track/song, the individual prices submitted by all relevant parties may be aggregated and run through the calculation module 30 in order to determine whether the aggregate price is within a market range for similar types of requests previously transacted by the system 10. Should the total price quoted not fall within such a market range, the licensing module 28 may inform the seller that it is under quoting or over quoting, as the case may be, and provide the seller with the option to change its price to within the market range. Should the total price quoted fall within the market range, then the quote may be submitted directly to the registered buyer at step 52. The unconfirmed quote details may be put into the requesting buyer's production file, where the buyer can view the unconfirmed quote details. The buyer may also get an email notifying the buyer of the unconfirmed quote. Conversely, if at step 54 the seller rejects the quote invitation or does not respond within the specified period, the system 10 may send an electronic notice to the buyer that the seller declined to provide a quote at step 56.

Returning to step 52, after notice of the seller's quote is provided to the buyer, the buyer may either accept the quote (at step 58) or reject the quote (at step 60). If the buyer rejects the quote, at step 62, the system 10 may send an email or other electronic notification to the seller notifying the seller that the buyer rejected the quote. In some embodiments, the system 10 may then return to step 50, allowing the seller to make another unconfirmed quote.

If at step 58 the buyer accepts the quote, the process may advance to step 64, where the system 10 sends an email or other electronic notification to the seller notifying the seller that the buyer accepted the quote. Then, at step 66, the seller may respond with a confirmed quote, which may be communicated to the buyer in the usual fashion at step 68. If the buyer declines the confirmed quote at step 70 for some reason, the process may return to step 50, allowing the seller to make another unconfirmed quote.

If the buyer accepts the confirmed quote at step 72, notice of the buyer's acceptance of the confirmed quote may be sent electronically to the seller by email, who may reject the confirmed quote at step 74 (in which case the process may return to step 50) or accept the confirmed quote at step 76. If the seller accepts the confirmed quote, the licensing module 28 may email or otherwise electronically send draft contracts to each party that embodies the licensing terms at step 78. The electronic draft contracts may be in PDF format, for example. According to various embodiments, a default contract per usage type may be generated by the licensing module 28, the contracts having, for example, a pre-defined appendix that is editable (e.g., for clauses and terms, logos, etc.). The licensing module 28 may populate the contract with the quote details (such as buyer (licensee), seller (licensor), track details, usage details, creation date, etc.). The contract may also have predefined areas where the seller (licensor) can edit certain information, such as reference number, clauses, ISWC, reference number, etc.

Once the license terms are agreed to, the contract may be confirmed at step 80 and closed at step 82. The parties may execute the contract using digital signatures, for example. Alternatively, one of the parties may mail two signed copies of the contract to the counter party or to a broker associated with the system 10, who may forward the signed contracts to the counter party. The signed versions of the contract may be uploaded to the production folder. In some embodiments, the buyer may be required to pay an upfront portion of the license fee upon signing the contract. This fee may be paid via electronic means, such as via an online payment service or a wire transfer service. In addition, the system 10 may send email reminders to each party when the license is near expiry.

According to various embodiments, the system 10 may hold the edited contract or the selected contract against the quote. When the buyer wants to view the contract, the system 10 may display the contract as a PDF from the production folder. If the buyer wants to decline the contract, the buyer can send a note back to the seller with reasons why. The seller can then amend the contract if so desired.

Referring back to FIG. 1, the system 10 may also include a licensor management module 31. The licensor management module 31 may allow music sellers to upload tracks, manage metadata, promote their artists to commercial music buyers aggregated in one location, respond to music briefs and music license requests directly to commercial music buyers. Furthermore, sellers/licensors may be able to view statistics as to the frequency of their music being searched for, listened to, placed in production folders, requested to be licensed, and actually licensed, as well as view similar information regarding the activity of buyers globally as well as per individual buyer sector.

Users (e.g., buyers) may also download digital versions of the copyrighted works from the system 10. To obtain a digital file containing the selected track(s), the user/buyer may click on a link in the production folder to download the track(s) from the system 10 once that track has been placed into a production folder. According to various embodiments, the user may need to have an active user session at the system 10 and the necessary permissions granted to his/her account for that downloaded file to be delivered directly to their computer or workstation via the network 16. The files may be, according to various embodiments, 320 k stereo MP3 files (broadcast quality) for "test purposes," which cannot be used in a broadcast production until a license has actually been granted FIG. 4 is a diagram of a computer-based system 200 according to other embodiments of the present invention. The system 200 may be used to detect and recognize a copyrighted work in a file uploaded to a file sharing service and, if a copyrighted work is recognized, to automate licensing negotiations if necessary with the copyright owner(s). A file uploader 202 may upload a file, such as a digital video file, to the system 200 via a network 203 (such as the Internet). The uploaded file may be stored in a database 206. The system 200 may comprise a file sharing server system 204 that posts the file on a web site or other host so that other users may access the file via the network 203.

In addition, a recognition engine 208 may process or scan the uploaded file in order to detect and recognize copyrighted works in the file. For example, if the uploaded file is a video file, the recognition module 208 may process the uploaded file to detect copyrighted music tracks, video, or images. The system 200 may have numerous recognition engines for different types of files, including different types of sound, video, and image files. The recognition engine(s) 208 may use pattern recognition algorithms on the uploaded files to detect and recognize copyrighted works (if any) in the uploaded files. U.S. Pat. No. 5,918,223, which is incorporated herein by reference, discloses techniques for recognizing copyrighted music files in a digital file. The recognition module(s) 208 may be implemented as a computer device(s) (e.g., a server(s)) that is programmed with software to detect and recognize the copyrighted work(s). The software may be stored in a memory device of the computer device, and may be executed by a processor of the computer device.

If a copyrighted work is detected, the licensing system 22 may determine whether the identified work is included on a pre-cleared list of works, which may be supplied by relevant copyright owners/licensors. If the identified work is not on the pre-cleared list, the licensing system 22 may initiate licensing operations between the file uploader 202 and the appropriate licensor(s) using, for example, the process described above in connection with FIG. 2. For example, the licensing system 22 may send an email to a licensor of the copyright with an activation link to a web site at which the licensor can access the uploaded file and enter an unconfirmed license quote. If the licensor enters an unconfirmed license quote, the licensing system 22 may mediate the licensing negotiations in a manner similar to the manner described about in connection with FIG. 2. In addition, if a license is obtained as a result of the process, downloads of the file from the file sharing server system 204 may be monitored with revenue (e.g., advertising revenue), if any, generated from the downloads shared with the copyright owner(s). If a license is not obtained, the uploaded file may be removed from the web site so that it may best be downloaded by others.

It is to be understood that the figures and descriptions of the embodiments have been simplified to illustrate elements that are relevant for a clear understanding of the embodiments, while eliminating, for purposes of clarity, other elements. For example, certain operating system details and modules of the computer system mentioned above are not described herein. Those of ordinary skill in the art will recognize, however, that these and other elements may be desirable in a typical processor, computer system or e-mail application, for example. However, because such elements are well known in the art and because they do not facilitate a better understanding of the embodiments, a discussion of such elements is not provided herein.

In general, it will be apparent to one of ordinary skill in the art that at least some of the embodiments described herein may be implemented in many different embodiments of software, firmware and/or hardware. The software and firmware code may be stored in a memory and executed by one or more processors or any other similar computing device of the computer systems. The software code or specialized control hardware which may be used to implement embodiments is not limiting. For example, embodiments described herein may be implemented in computer software using any suitable computer software language type such as, for example, C or C++ using, for example, conventional or object-oriented techniques. The memory storing the software may be any type of suitable computer-readable medium or media such as, for example, a magnetic or optical storage medium, a random access memory (RAM) or a read only memory (ROM) (including a PROM). The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers, computer devices, or computer systems, and/or processors of the various computer-based systems described above. Software that may cause programmable equipment to execute processes may be stored in any storage device, such as, for example, a computer system (non-volatile) memory, an optical disk, magnetic tape, or magnetic disk. Furthermore, at least some of the processes may be programmed when the computer system is manufactured or stored on various types of computer-readable media. Such media may include any of the forms listed above with respect to storage devices.

It can also be appreciated that certain process aspects described herein may be performed using instructions stored on a computer-readable medium or media that direct the computer systems to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semi-permanent and/or semi-temporary. A computer-readable medium may further include one or more data signals transmitted on one or more carrier waves.

A "computer," "computer system," "computer device", "host," or "processor" may be, for example and without limitation, a wireless or wireline variety of a processor, microcomputer, minicomputer, server, mainframe, laptop, personal data assistant (PDA), wireless e-mail device (e.g., "BlackBerry" trade-designated devices), cellular phone, pager, processor, fax machine, scanner, or any other programmable device configured to transmit and/or receive data over a network. Computer systems and computer-based devices disclosed herein may include memory for storing certain software applications used in obtaining, processing and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component, to perform a given function or functions. Except where such substitution would not be operative, such substitution is within the intended scope of the embodiments. Any servers described herein, for example, may be replaced by a "server farm" or other grouping of networked servers that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations and adaptations to those embodiments may occur to persons skilled in the art with attainment of at least some of the advantages. The disclosed embodiments are therefore intended to include all such modifications, alterations and adaptations without departing from the scope of the embodiments as set forth herein.

What is claimed is:

1. A search and licensing system comprising:
   a database storing data regarding copyrighted works;
   a search engine computer system in communication with the database for searching the database for copyrighted works in response to search criteria input by a user; and
   a licensing computer system that implements licensing negotiations between the user and a copyright licensor for a selected copyrighted work selected by the user from results of the searching, wherein the licensing computer system is programmed to:
      receive a license request from the user that comprises one or more licensing parameters from the user for a license to use the selected copyrighted work, wherein the one or more licensing parameters comprise an intended usage for the copyrighted work;
      in response to the license request from the user, and prior to distribution of the selected copyrighted work to the user with license rights to use the copyrighted work for the intended usage, send an electronic quote request via email to the licensor, the email containing an activation link to a web site at which the licensor can enter a quote for the license to use the copyrighted work in accordance with the intended usage specified by the user in the license request;
      provide the user with an electronic unconfirmed quote of the licensor when the licensor enters the unconfirmed quote in response to the quote request;
      notify the licensor of the user's acceptance of the unconfirmed quote when the user accepts the unconfirmed quote;
      send an electronic confirmed quote to the user when the user accepts the unconfirmed quote;
      send draft electronic contracts to the user and the licensor when both the licensor and the user accept the confirmed quote; and
      notify the user that the licensor has declined to license when the licensor does not respond to the quote request within a specified period of time.

2. The system of claim 1, wherein the copyrighted work is work selected from the group consisting of a music track, an image, and a video.

3. The system of claim 1, wherein the licensing computer system is programmed to allow the user to input the use details for a copyrighted work in a production folder.

4. The system of claim 1, wherein the specified period of time is twenty-four hours.

5. The system of claim 1, wherein the electronic contracts comprise terms based on the use details entered by the user.

6. The system of claim 1, wherein the licensing computer system is programmed to calculate whether the unconfirmed quote from the licensor is within a market range for be copyrighted work to the licensed given the use details input by the user.

7. A computer-assisted method for licensing a copyrighted work comprising:
   storing data regarding copyrighted works in a database;
   searching the database by search engine computer system for copyrighted works in response to search criteria input by a user;
   receiving, using a computerized licensing system comprising one or more computer, via an electronic communication network, a license request from the user that comprises one or more licensing parameters from the user for a license to use the selected copyrighted work, wherein the one or more licensing parameters comprise an intended usage for the copyrighted work;
   in response from a license request from the user, by the computerized licensing system, and prior to distribution of the selected copyrighted work to the user with license rights to use the copyrighted work for the intended usage, sending an electronic quote request via email to a licensor of the copyrighted work, the email containing an activation link to a web site at which the licensor can enter a quote for the license to use the copyrighted work in accordance with the intended usage specified by the user in the license request,
   providing the user with an electronic unconfirmed quote of the licensor when the licensor enters the unconfirmed quote in response to the quote request;
   notifying the licensor of the user's acceptance of the unconfirmed quote when the user accepts the unconfirmed quote;
   sending an electronic confirmed quote to the user when the user accepts the unconfirmed quote;
   sending draft electronic contracts to the user and the licensor when both the licensor and the user accept the confirmed quote; and
   notifying, by the computerized licensing system, the user that the licensor has declined to license when the licensor does not respond to the quote request within a specified period of time.

8. The method of claim 7, wherein the electronic contracts comprise terms based on the use details entered by the user.

9. The method of claim 7, further comprising determining whether the unconfirmed quote from the licensor is within a market range for the copyrighted work to be licensed given the use details input by the user.

10. A search and licensing system comprising:
    a database storing data regarding copyrighted works;
    one or more processors in communication with the database;
    a memory in communication with the one or more processors, the memory storing software which when executed by the one or more processors cause the one or more processors to:
       search the database for copyrighted works in response to search criteria input by a user;
       receive a license request from the user that comprises one or more licensing parameters from the user for a license to use the selected copyrighted work, wherein the one or more licensing parameters comprise an intended usage for the copyrighted work;
       in response to a license request from the user, and prior to distribution of the selected copyrighted work to the user with license rights to use the copyrighted work for the intended usage, send an electronic quote request via email to the licensor, the email containing an activation link to a web site at which the licensor can enter a quote for the license to use the copyrighted work in accordance with the intended usage specified by the user in the license request;
       provide the user with an electronic unconfirmed quote of the licensor when the licensor enters the unconfirmed quote in response to the quote request;
       notify the licensor of the user's acceptance of the unconfirmed quote when the user accepts the unconfirmed quote;
       send an electronic confirmed quote to the user when the user accepts the unconfirmed quote;
       send draft electronic contracts to the user and the licensor when both the licensor and the user accept the confirmed quote; and
       notify the user that the licensor has declined to license when the licensor does not respond to the quote request within a specified period of time.

11. The system of claim 10, wherein the electronic contracts comprise terms based on the use details entered by the user.

12. The system of claim 10, wherein the memory further comprises software which when executed by the one or more processors causes the one or more processors to calculate whether the unconfirmed quote from the licensor is within a market range for the copyrighted work to be licensed given the use details input by the user.

* * * * *

UNITED STATES PATENT AND TRADEMARK OFFICE
CERTIFICATE OF CORRECTION

PATENT NO. : 7,778,929 B2
APPLICATION NO. : 12/001866
DATED : August 17, 2010
INVENTOR(S) : Richard Corbett It is certified that error appears in the above-identified patent and that said Letters Patent is hereby corrected as shown below:

Column 11, line 52, delete "be" and substitute --the--

Column 11, line 53, delete "licensed" and substitute --licensee--

Signed and Sealed this
Eighteenth Day of January, 2011

David J. Kappos
*Director of the United States Patent and Trademark Office*